(12) United States Patent
Viswanathan

(10) Patent No.: US 9,432,485 B2
(45) Date of Patent: Aug. 30, 2016

(54) METHOD AND SYSTEM OF AN ACCELERATED APPLICATION-ORIENTED MIDDLEWARELAYER

(71) Applicant: Srinivasan Viswanathan, Fremont, CA (US)

(72) Inventor: Srinivasan Viswanathan, Fremont, CA (US)

( * ) Notice: Subject to any disclaimer, the term of this patent is extended or adjusted under 35 U.S.C. 154(b) by 120 days.

(21) Appl. No.: 14/214,611

(22) Filed: Mar. 14, 2014

(65) Prior Publication Data
US 2015/0264158 A1    Sep. 17, 2015

(51) Int. Cl.
*H04L 29/06* (2006.01)
*G06F 17/30* (2006.01)

(52) U.S. Cl.
CPC ......... *H04L 67/42* (2013.01); *G06F 17/30091* (2013.01)

(58) Field of Classification Search
CPC ...................... G06F 9/5027; G06F 17/30091
USPC ........ 709/203, 204, 205, 209; 717/173, 178, 717/124
See application file for complete search history.

(56) References Cited

U.S. PATENT DOCUMENTS

| | | | |
|---|---|---|---|
| 7,171,452 B1* | 1/2007 | Gole .................. | G06F 11/2092 709/212 |
| 2010/0146085 A1* | 6/2010 | Van Wie ................. | A63F 13/12 709/220 |

OTHER PUBLICATIONS

"Optimizing Virtual Storage Performance"—Barry Whyte, IBM, Jun. 2013 https://www.ibm.com/developerworks/community/blogs/storagevirtualization/resource/Edge-1038-Optimizing-Virtual-Storage-Performance_v2.0_final.pdf?lang=en.*

* cited by examiner

*Primary Examiner* — Randy Scott

(57) ABSTRACT

In one exemplary embodiment, a method includes the step of instantiating, with at least one processor, a storage object. The storage object includes a unique identifier, a data element and a virtual storage object. The virtual storage object is formed in the storage object. The virtual storage object includes a virtual data element. A set of kernel functions of a client-side computing system utilizing the application-orientedmiddleware layer are invoked. The set of kernel functions implement formation of an application data object. The application data object maps files and directories to the virtual storage object and integrates into a filesystem interface of an operating system of the client-side computing system. The application data object is formed. A data routing service of the application data object is initiated.

18 Claims, 10 Drawing Sheets

| Object class | Allowed Types |
|---|---|
| STO | ext3, proxy |
| STO | nfs, proxy |
| STO | autofs, proxy |
| STO | dgp |
| STO | xfs, proxy |
| STO | ext4, proxy |
| VSTO | Regular |
| VSTO | passthrough |
| VSTO | metapass |
| VSTO | cache |
| VSTO | Replica management |
| ADO | passthrough, cached, non-cached |
| ADO | split, cached or non-cached |
| ADO | metapass, concat or non-concat |
| ADO | distributed passthrough |
| ADO | distributed split (for Hadoop) |
| ADO | passthrough, auto-cached |

METHOD AND SYSTEM OF AN ACCELERATED APPLICATION-ORIENTED MIDDLEWARELAYER

CROSS-REFERENCE TO RELATED APPLICATIONS

This application claims the benefit of U.S. Provisional Application No. 61/793,228, filed Mar. 15, 2013 and titled 'METHOD AND SYSTEM OF MANAGING A DATABASE SYSTEM'. This provisional application is incorporated herein by reference.

BACKGROUND

1. Field

This application relates generally to data storage, and more specifically to a system, article of manufacture and method for an accelerated application-oriented dynamic data management middleware layer.

2. Related Art

An increasing number of applications utilize storage servers to store and retrieve information. These applications typically use a software component known as filesystems or drivers to operatively connect the application to the data stored in that storage server.

BRIEF SUMMARY OF THE INVENTION

In one aspect, a method includes the step of instantiating, with at least one processor, a storage object. The storage object includes a unique identifier, a data element and a virtual storage object and element name space. The virtual storage object is formed in the storage object. The virtual storage object includes a virtual data element. An element name space forms the set of data elements with similar properties. A set of kernel functions of a client-side computing system utilizing the application-orientedmiddleware layer are invoked. The set of kernel functions implement formation of an application data object. The application data object maps files and directories and other application data to the virtual storage object and integrates into a filesystem interface of an operating system on the client-side computing system. The application data object is formed. A data routing service of the application data object is initiated that provides dynamic data placement based on performance, reliability and scalability requirements of the applications.

BRIEF DESCRIPTION OF THE DRAWINGS

The present application can be best understood by reference to the following description taken in conjunction with the accompanying figures, in which like parts may be referred to by like numerals.

FIG. 9 illustrates a table depicting various data object classes and corresponding allowed data types, according to some embodiments.

Figure 1:
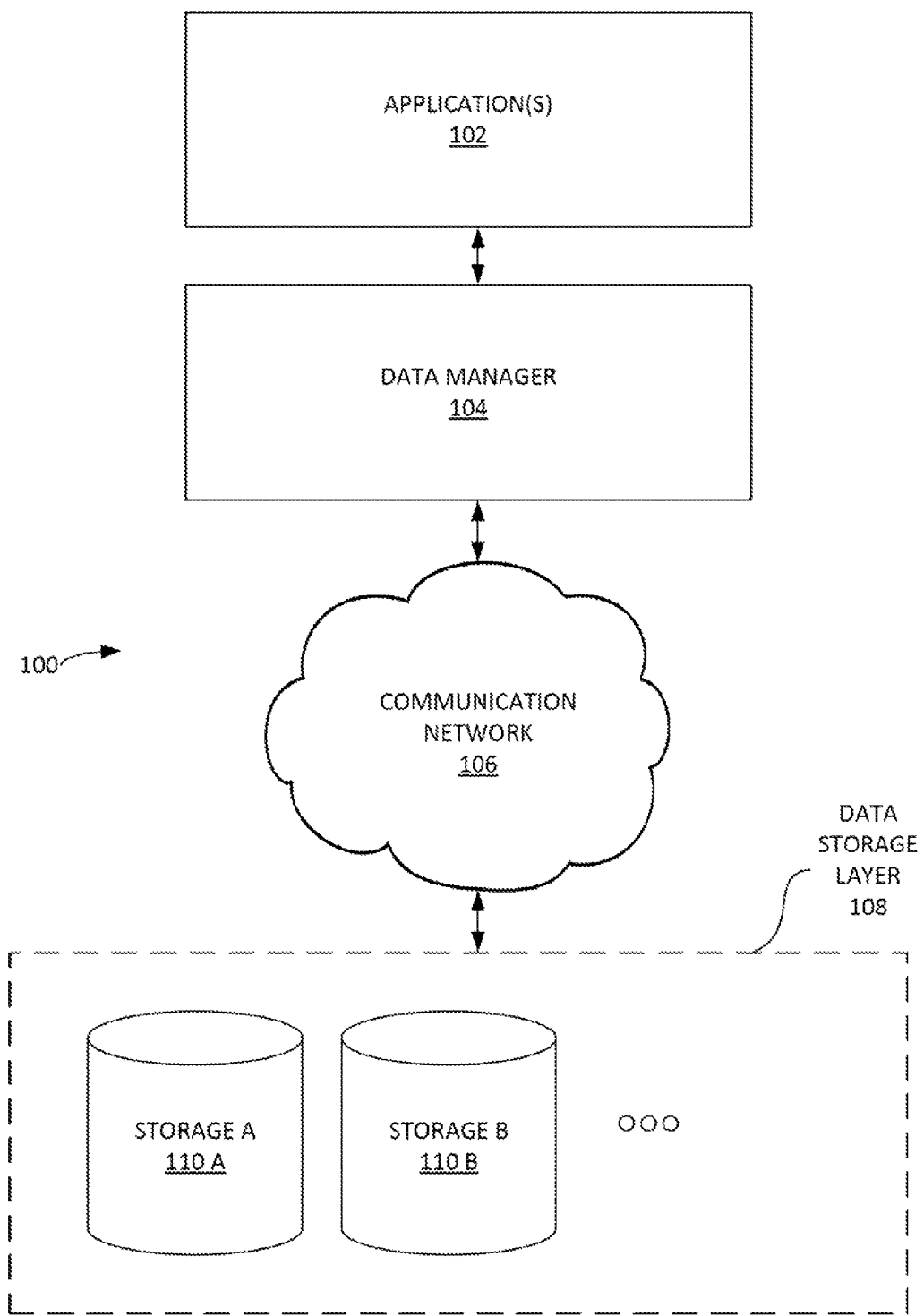
FIG. 1 illustrates an example data management system, according to some embodiments.

The Figures described above are a representative set, and are not an exhaustive with respect to embodying the invention.

DETAILED DESCRIPTION

Disclosed are a system, method, and article of manufacture for implementing an accelerated application-oriented middleware layer. The following description is presented to enable a person of ordinary skill in the art to make and use the various embodiments. Descriptions of specific devices, techniques, and applications are provided only as examples. Various modifications to the examples described herein may be readily apparent to those of ordinary skill in the art, and the general principles defined herein may be applied to other examples and applications without departing from the spirit and scope of the various embodiments.

Reference throughout this specification to "one embodiment," "an embodiment," "one example," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Exemplary Environment and Architecture

FIG. 1 illustrates an example data management system 100, according to some embodiments. In one embodiment, data manager 104 (e.g. a Datagres® middleware platform such as The systems and methods of the FIGS. 1-10®) can include a middleware layer (e.g. a application-oriented middleware layer) that enables communication and management of data between an operating system at the application (s) 102 layer and various distributed data storage applications (e.g. such as data storage and/or filesystems) in the data store layer 108. As used herein, a 'layer' can refer to an abstraction layer of data management system 100. As used herein, a middleware layer can include functionalities and/or systems that are between the operating system applications (e.g. application(s) 102) and a data storage layer 108 on each side of a distributed computing system in a computer network. Data manager 104 can manage data from its origin until its deletion, taking it through the entire life cycle of growth, mobility, reliability, scalability and performance. Data manager 104 can be implemented to manage placement and/or dynamic distribution of data to satisfy any relevant service-level agreements (SLA), service-level objectives (SLO) (and the like) related to application(s) 102. Data manager 104 can provide access to a number of applications (e.g. storage 110 A-B). Communication network 106 can include various computer network systems and protocols (e.g. the Internet, database communication networks, Ethernet, etc.).

Data manager 104 can include engineering design and implementation principles related to, inter alia, the following: asynchrony/loosely coupled properties for distributed and scalable development of the features of the architecture; multi-threading to support SMP environment; instrumentation and observation of the internals of the system for support, monitoring and debugging; high performance I/O, optimized algorithms for caching, Efficient resynchronization of the objects; portability across multiple operating system (OS) versions; self-described objects and the ability to assemble them together on-demand as and when they arrive; command-line utilities that form the basis of development and customer interactions; high availability (HA) features of hardening, disconnected operations, and clustered deployments; multi-tenant architectural properties of resource management, isolation, and security; ease of installation and upgrades; reliability of persistent data structures and meta data management; multi-level debugging ability with dynamic on/off of various levels both at user level and system level; verification of the deployed configurations, and integrity of the data; various Data Collection Policies via monitoring of the system from fine grained to coarse grained collection; intelligent analytics of the data collected at both fine and coarse grained level; related reporting for knowledge management, conclusions and feedback loop; ability to build scalable data center based abstractions of logical domains, storage spaces, grid analytics; integrated health management of the services; event notifications from kernel to help address the dynamic state changes in the system; in-built tools/primitives for building intelligent test framework and backdoor verifications; distribution abstractions of the objects for ease of use and management; and accounting to keep the block calculations of alloc/free, space policies, etc., consistent across multiple shared large no. of objects on heterogeneous elements.

It is noted that the systems and methods provided in FIG. 1 and subsequent figures disclose embodiments for implementation in a database system. However, additional implementations in various applications that utilizes data and data storage. Several additional use cases are now provided by way of example. The systems and methods of the Figures can be modified according to each use case. In one example, the systems and methods of the FIGS. 1-10 can be implemented in media and render farm applications (e.g. Maya 3D®, AutoDesk®, Blender®, etc.) for processing and rendering of animations, special effects, layer impositions on various movies and other similar videos. These applications can have Petabytes of data coming from Network File Systems. The 'hot' data can be cached on local drives, thereby drastically reducing their data access time. This can also leads to faster completion of the jobs. As used herein, 'hot' data can refer to frequently accessed data. Hot data typically can be set at a good cache-hit rate.

In another example, the systems and methods of the FIGS. 1-10 can be implemented in E-CAD applications (e.g. Autodesk®, Stylus®, etc.). For example, local caching of hot data can be implemented in applications such as chip designing, motherboard designing, and fabrication of chips and other related work.

In another example, the systems and methods of the FIGS. 1-10 can be implemented in database solutions (MySQL®, PostgrSQL® etc.). For example, database access can be accelerated by the data acceleration and caching system which leads to reduction in latency of access and increase in number of Transactions per Second (TPS).

In another example, the systems and methods of the FIGS. 1-10 can be implemented in file servers (e.g. server data to end users remotely). For example, the hot data can be cached by data management system 100 leading to faster access by users.

In another example, the systems and methods of the FIGS. 1-10 can be implemented in web servers (e.g. webserver like Apache, Tomcat etc.). For example, similar to file servers, but there the web content is cached by data management system 100 and served from cache devices resulting in faster loading of web page documents.

In another example, the systems and methods of the FIGS. 1-10 can be implemented in various proprietary applications. For example, any application designed and developed by any individual/organization, which accesses data from a local device and/or a NFS Share, can be accelerated by data management system 100 resulting in a great boost in application performance.

In another example, the systems and methods of the FIGS. 1-10 can be implemented in email servers (e.g. Zimbra, etc.). For example, data management system 100 can accelerate an email servers by caching the hot data (e.g. comprises email and its metadata) thereby leading to a faster email access.

In another example, the systems and methods of the FIGS. 1-10 can be implemented in virtualization environments (e.g. Xen, KVM, etc.). The hot areas of the virtual machines (VM) can be cached by data management system 100 thereby resulting in faster VMs and/or allowing more VMs to be accommodated in the same physical server.

For example, an entire set of application data can be replicated and distributed partially or wholly synchronously or asynchronously across a bunch of heterogeneous filesystems or storage servers, both on LAN and/or WAN. The set of storage servers could be any of network or local filesystems or network or local block devices. These servers can reside in the LAN environment or WAN. Big data mining applications can use the platform provided herein to distribute, in a scalable manner, and access the data in a high performing, reliable way between distributed enterprises or service providers. Customers wanting to remove vendor lock in can replicate their data between boxes of two different vendors using the systems provided herein. An analytics feature of the systems provided herein can provide an efficient loop back mechanism from applications to the IT architecture fine tuning.

In general, data management system 100 can boost performance of an application that has its data coming from a local device (e.g. EXT3, EXT4, XFS) and/or an NFS network share.

Figure 2:
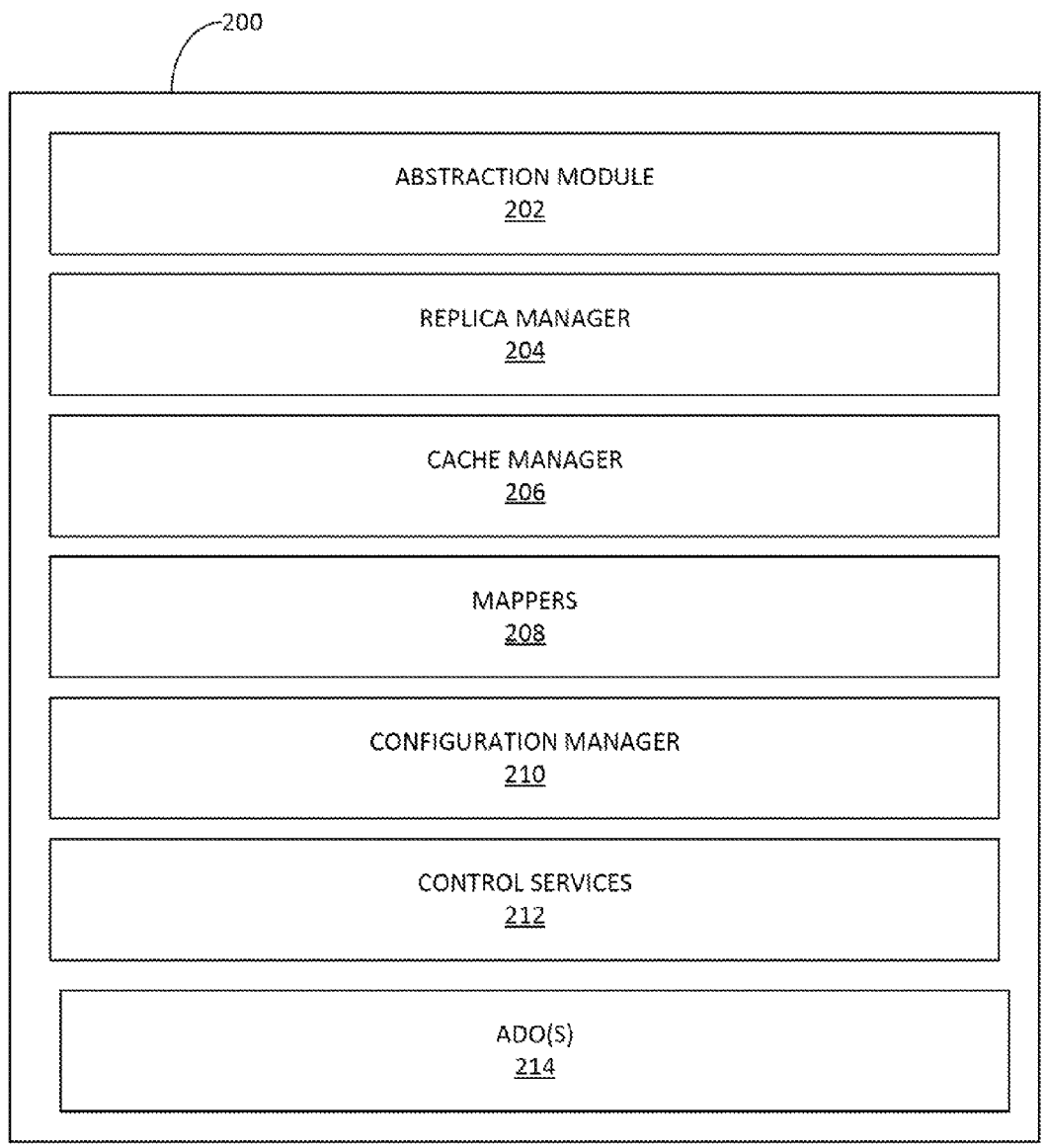
FIG. 2 depicts, in block diagram format, an example data manager according to some embodiments.

FIG. 2 depicts, in block diagram format, an example data manager 200 according to some embodiments. In some embodiments, data manager 200 can implement data manager 104 in FIG. 1. Data manager 200 can interface client-side applications (e.g. via one or more application program interfaces (APIs).

Data manager 200 can include abstraction module 202. Abstraction module 202 can abstract heterogeneous data elements (e.g. third extended filesystem (ext3), Network Filesystem (NFS), etc.) into as storage objects (STO). A data element can be an atomic unit of data. Heterogeneous data elements can have different characteristics and formats such as data storage blocks, data files, network-attached storage (NAS) format, etc.). STOs can then be logically divided into these Virtual Storage Objects (VSTO). A VSTO can represent an instance of using a specific storage object for various purposes in the layers above it. A VSTO can have a defined interface that allows for extensible and/or scalable support for different data element types and/or protocols such as NAS, storage area network (SAN), iSCSI (Internet Small Computer System Interface protocol), Direct-attached storage (DAS), etc. A VSTO can also characterize the different properties of usage by the layers above it.

Replica manager 204 can utilize STO and VSTO objects for full and/or partial replication of data and other related operations. Replica manager 204 can view an underlying VSTO as a replica. Replica manager 204 can manage the synchronization of any distribution requests in order to satisfy the requests/requirements of the above layers. Cache manager 206 can provide a cached-version of a VSTO (e.g. a cache virtual storage object). For example, cache manager 206 can transparently stores VSTO data for various purposes, including the purpose that future requests for that data can be served faster. Mappers 208 can map various objects (e.g. STO and/or VSTO objects) between layers and also mapping the unique identifiers and/or handles of the objects to the lower layers of a data management system (such as data management system 100).

Configuration manager 210 can manage the integrity of the relationship of the objects. Configuration manager 210 can manage object creation. Configuration manager 210 can manage object deletion. Configuration manager 210 can manage dynamic transitions of object state. Configuration manager 210 can reside inside the client-device operating system's kernel. Control services 212 can be implemented in the client-device layer (e.g. user layers). Control services 212 can provide the primitives required for the data manager 200 management framework. Control servers 212 can be operatively connected with and, thus, interact with the configuration manager 210 of the client-device operating system's kernel. Control servers 212 can provide location independent interaction with the objects.

Application Data Object (ADOs) 214 can operatively connect with a client-side application and provide the file-system interface for said applications. ADOs 214 can be implemented above the replication layer (e.g. as provide supra).

Data manager 200 can provide a user interface that enables a user to set various data manager 200 settings and/or parameters. Data manager 200 can further provided back-end management of the objects in co-ordination with the kernel layers.

Figure 3:
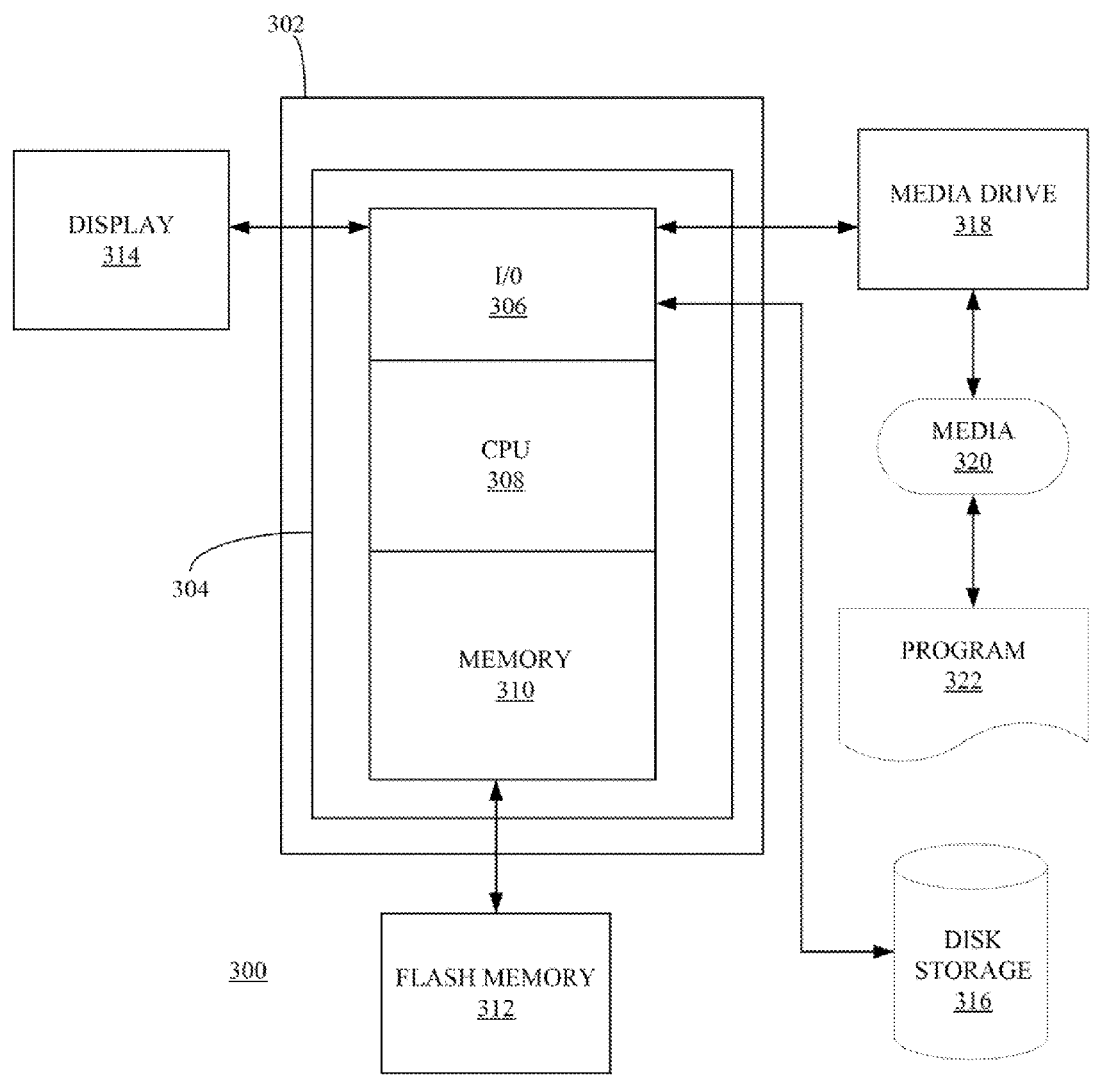
FIG. 3 is a block diagram of a sample computing environment that can be utilized to implement some embodiments.

FIG. 3 depicts an exemplary computing system 300 that can be configured to perform any one of the processes provided herein. In this context, computing system 300 may include, for example, a processor, memory, storage, and I/O devices (e.g., monitor, keyboard, disk drive, Internet connection, etc.). However, computing system 300 may include circuitry or other specialized hardware for carrying out some or all aspects of the processes. In some operational settings, computing system 300 may be configured as a system that includes one or more units, each of which is configured to carry out some aspects of the processes either in software, hardware, or some combination thereof.

FIG. 3 depicts computing system 300 with a number of components that may be used to perform any of the processes described herein. The main system 302 includes a mother-board 304 having an I/O section 306, one or more central processing units (CPU) 308, and a memory section 310, which may have a flash memory card 312 related to it. The I/O section 306 can be connected to a display 314, a keyboard and/or other user input (not shown), a disk storage unit 316, and a media drive unit 318. The media drive unit 318 can read/write a computer-readable medium 320, which can include programs 322 and/or data. Computing system 300 can include a web browser. Moreover, it is noted that computing system 300 can be configured as a middleware server.

Figure 4:
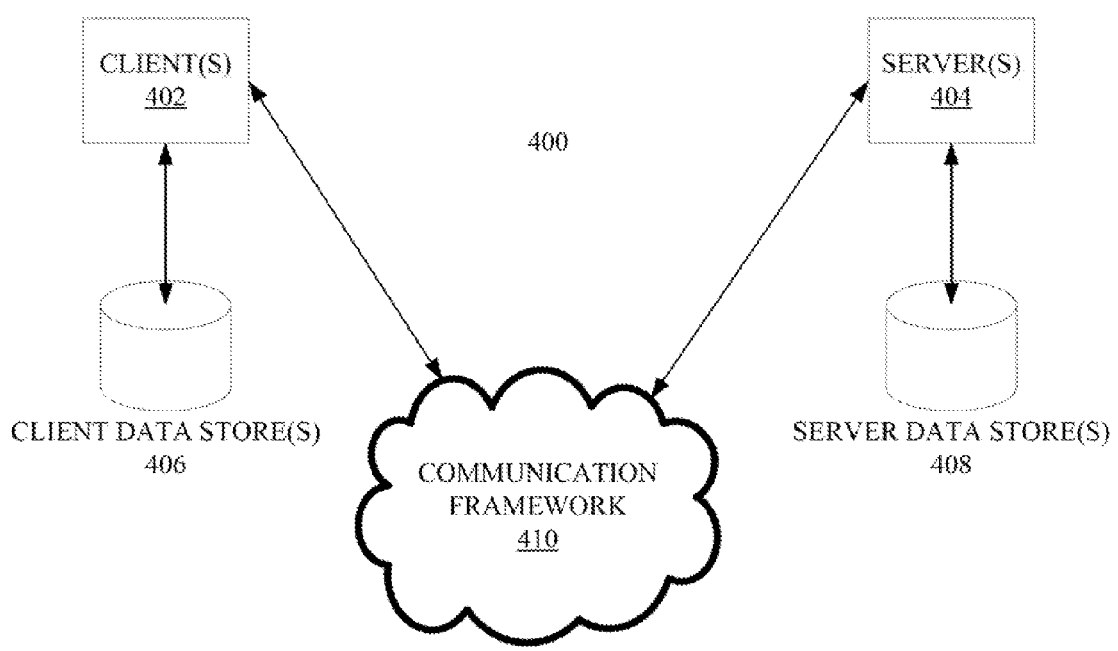
FIG. 4 is a block diagram of a sample computing environment that can be utilized to implement some embodiments.

FIG. 4 is a block diagram of a sample computing environment 400 that can be utilized to implement some embodiments. The system 400 further illustrates a system that includes one or more client(s) 402. The client(s) 402 can be hardware and/or software (e.g., threads, processes, computing devices). The system 400 also includes one or more server(s) 404.

The server(s) 404 can also be hardware and/or software (e.g., threads, processes, computing devices). One possible communication between a client 402 and a server 404 can be in the form of a data packet adapted to be transmitted between two or more computer processes. The system 400 includes a communication framework 410 that can be employed to facilitate communications between the client(s) 402 and the server(s) 404. The client(s) 402 are connected to one or more client data store(s) 406 that can be employed to store information local to the client(s) 402. Similarly, the server(s) 404 are connected to one or more server data store(s) 408 that can be employed to store information local to the server(s) 404.

In some embodiments, system 400 can be include and/or be utilized by the various systems and/or methods described herein to implement process 100. User login verification can be performed by server 404. Client 402 can be in an application (such as a web browser, augmented reality application, text messaging application, email application, instant messaging application, etc.) operating on a computer such as a personal computer, laptop computer, mobile device (e.g. a smart phone) and/or a tablet computer. In some embodiments, computing environment 400 can be implemented with the server(s) 404 and/or data store(s) 408 implemented in a cloud computing environment.

Exemplary Processes and Use Cases

Figure 5:
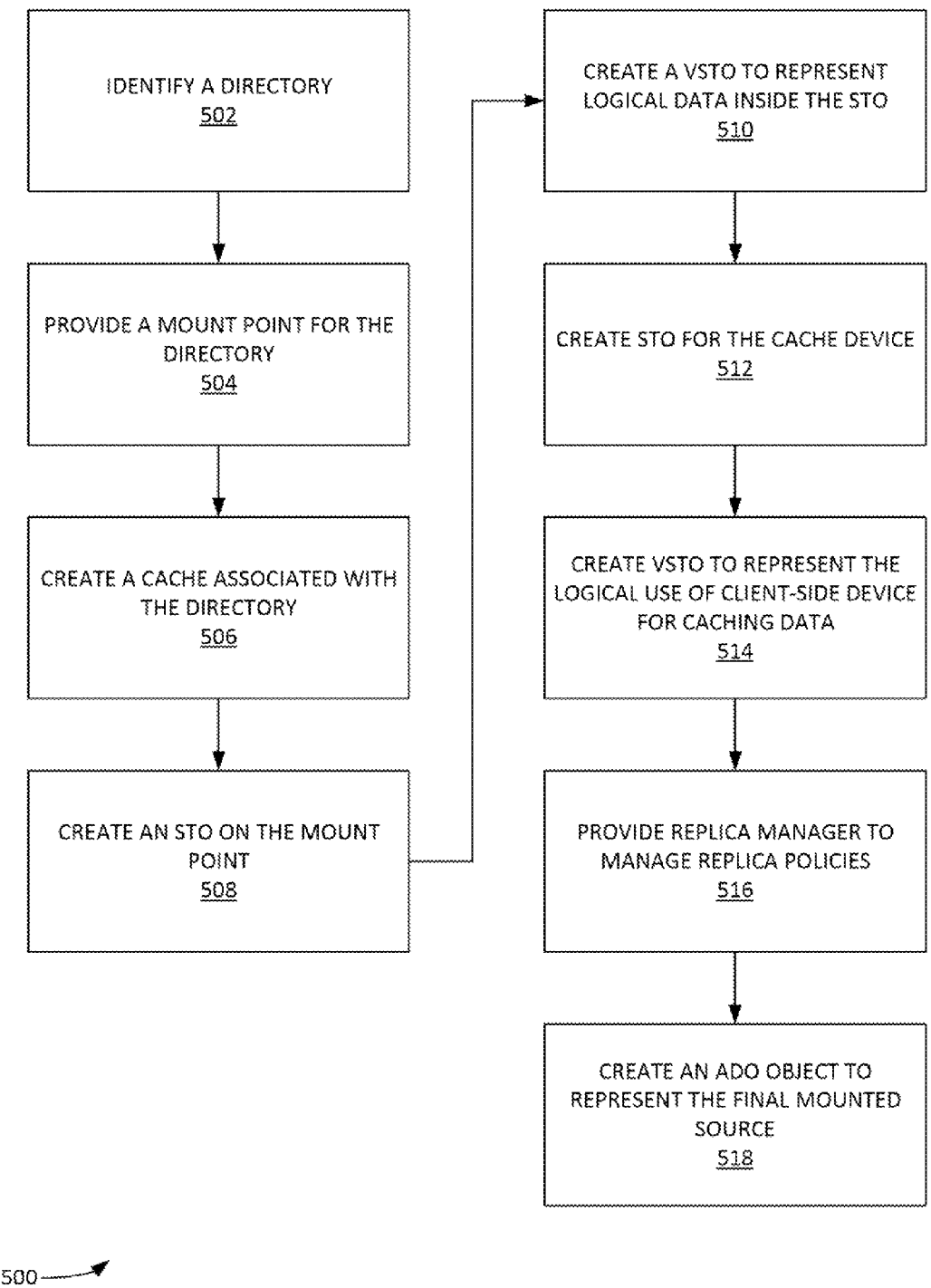
FIG. 5 illustrates an example process for mapping data objects, according to some embodiments.

FIG. 5 illustrates an example process 500 for mapping data objects, according to some embodiments. Data mapping can include processes of creating data element mappings between two or more distinct data models. Data mapping can be used as a step in a wide variety of data integration tasks. For example, process 500 can distribute data between high performance devices (such as SSD-based data system, existing NFS filesystems from a NAS system) and the native filesystems of a client-side OS.

In step 502, a directory can be identified. The directory can be identified for acceleration. A directory can include filesystem cataloging structure in which references to other computer files, and possibly other directories, are kept. A mount point under which you mount your filesystems or can be provided in step 504. As used herein, mounting can be defined as the process by which you make a filesystem available to the system. After mounting, your files will be accessible under the mount-point. In one example, the mount point can be designated by /mnt and the directory by /mnt/users/john.

In step 506, a cache can be created and associated with the directory. For example, a cache designated "cache-a" on /dev/sda using data manager 200 command line interface. In step 508, an STO can be created on the mount point. Continuing the above example, one STO (designated 's1') can be created for the filesystem on /mnt. This STO can be defined as 'proxy', and/or 'ext3 ' type object.

In step 510, a VSTO is created to represent logical data inside the STO of step 506. For example, the VSTO (designated 'v1s1') can be created to represent the logical "users/john" data inside the STO designated 's1'. In step 512, another STO can be created for the associated cache device. For example, an STO (designated 'c1') can be created for the cache device "/dev/sda". This STO can be defined as a 'proxy', 'ext3' and/or "cache" type object. In step 514, another VSTO is created to represent the logical use of the client-side device for caching data. For example, a VSTO (designated 'v1c1') can be created to represent the logical use of this device for caching data in "/users/john".

In step 516, a replica manager can be provided to manage replica policies. For example, a replica manager object (designated 'vr1') can group the v1s1, and v1c1 objects and manage v1c1 as a partial replica. The replica object can be a type VSTO, however it can be derived as an implementation of the VSTO, and implements replication policies. In step 518, an ADO object can be created to represent the final mounted source. For example, ADO object (designated 'ado1') can be provided to represent the final mounted source on /mnt/user/john, that is accelerated as a pass-through ADO.

Figure 6:
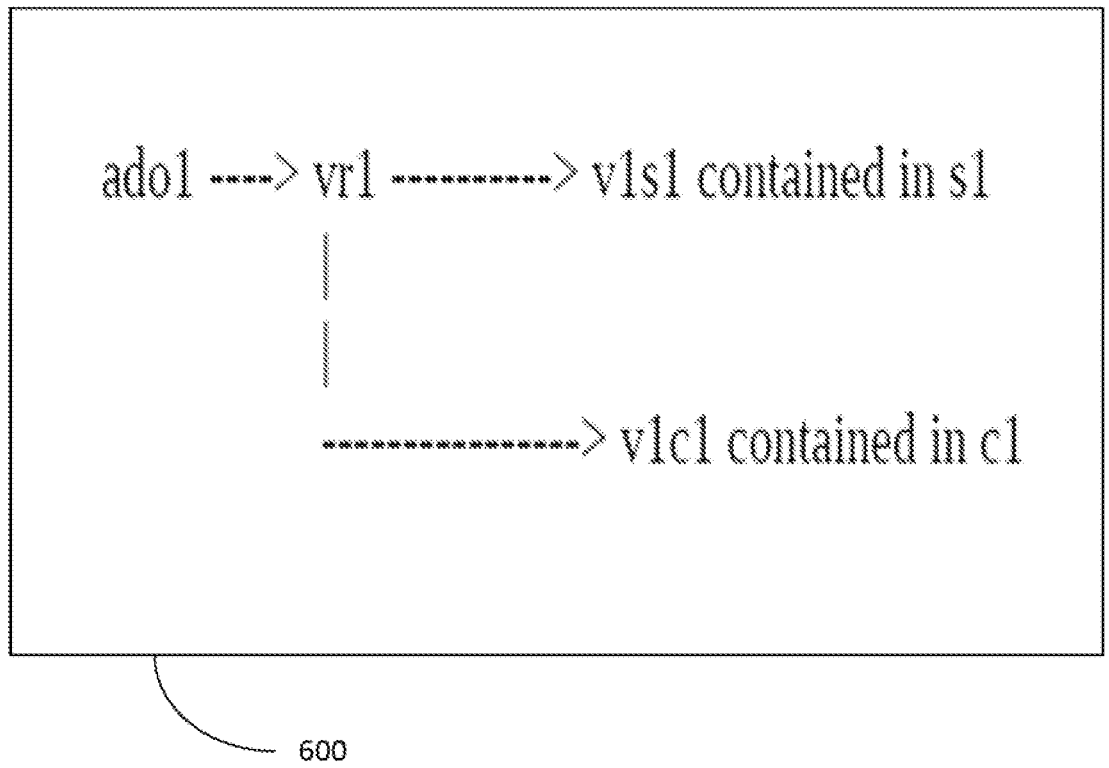
FIG. 6 depicts an example relationship of a set of data objects, according to some embodiments.

FIG. 6 depicts an example relationship 600 of a set of data objects, according to some embodiments. Relationship 600 can be created according to according to process 500. The example designations of the example provided in the description of process 500 can be utilized to interpret relationship 600.

Figure 7:
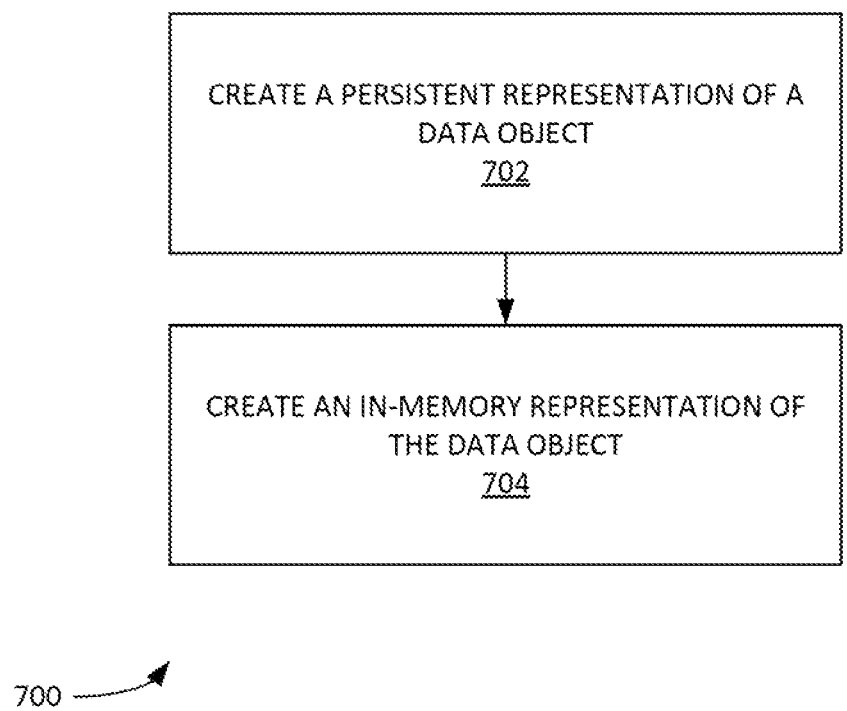
FIG. 7 an example process of data-object creation and instantiation in memory, according to some embodiments.

FIG. 7 an example process 700 of data-object creation and instantiation in memory, according to some embodiments. Process 700 can create two representations of a data object: a persistent representation and an in-memory representation. Accordingly, in step 702 of process 700, a persistent representation of the data object is created. Creation of a data object means combining its attributes and initial state, as well as, formulating a persistent-control block. In step 704, an in-memory representation of the data object can be created (e.g. instantiated in a random-access memory, (RAM)). In-memory creation of a data object can include combining attributes and/or initial state of the data object, as well as, the in-memory specific data structures for run-time operation of the data object. For example, the data can be read from a persistent-control block. Accordingly, the in-memory data object can have the authority to manage modifications of the associated data. For example, changes (e.g. write operations) can be accomplished in the in-memory data object first, and then performed to the persistent block. The collection of a data-object's persistent information (e.g. control blocks that are to be used in the formation of data objects during boot/reboot process) can be utilized as configuration information. In this way, in-memory instantiation of a data object can be accomplished by reading the persistent data structure of the persistent representation of the data object created in step 702. In some examples, data objects created by process 700 can include, inter alia, the following information: a unique sixty-four (64) bit identifier, a logical name, logical identifiers; sufficient information about the 'contained' objects to restart the 'contained' objects when the data object starts; sufficient information about a common 'parent' data object to assemble the parent data object such as and when a child data object is provided; parent data object information to its root; number of generation updates and other historical generation information of the data object (e.g. this information can be used to ensure a consistency configuration information); data object types, flags, and the like; and/or data object states.

Examples of persistent control blocks are now described with reference to the above use case example that includes STOs s1 and c1; VSTO's v1s1, v1c1; replica VSTO vr1; and ADO ado1, s1, c1 - STO, STO's can function as the control blocks (e.g. persistent control blocks). An STO can be formed at the time of creation of a data storage object for a source and a cache. A STO can have the following attributes, inter alia: type (e.g. ext3, proxy, NFS, XFS, DGP, etc.); state—online, offline, and other bunch; an identifier, information about all the VSTO's associated with the particulars STO. For example, an STO can store the identifiers of vs1, vc1. This information can be used to access control block information of vs1, vc1. The STO can further include information about the particular client-side device, mount options etc.

A VTSO control block can be formed during creation of the source. Similar to STO, a VTSO can include unique identifier, state, and information about its contained object STO (e.g. a contained object's identifier), information about an associated ADO, etc. Additionally, a VTSO can include a group identifier and/or replica identifier. In the present example, these identifiers can be the same for both data objects v1s1 and v1c1.

A replica data object (e.g. a Replica VSTO, a replica data manager) can have a persistent structure that is stored as part of the ADO data object. Replica data objects can include an execution engine for executing the ADO level policies (e.g. as driven from higher layer in the system's hierarchy). Each replica consists of min. two VSTOs for two way replication, and both the VSTOs will have the same group id or replica id.

The ADO control block (e.g. ADO ado1, etc.) can include the replica data-object information. The ADO control block can include a unique identifier, state, name of the directory (e.g. in this use case example "users/john"), number of replicas, etc. Each persistent replica data structure can represent the other replicas that have same copy of data. In the present example, these can be vs1, and vc1. The state of the synchronization of information between the two data objects can be stored in ADO and can used to determine out-of-sync copies. In the event that out-of-sync copies are determined, the ADO control blockcan synchronize them with various synchronization operations. The VSTO data object scan form a two way relationship with the ADO data objects and/or replica data objects. For example, an 'ado_replica' variable can identify a member of the control block that includes the replica information. Each replica at the ADO level can include all of the VSTOs that belong to a particular copy. The 'groupid' variables of the VSTOs can determine its corresponding sibling in another replica data object. The ado1 can be a 'passthrough' ADO (e.g. see infra). Various types of ADOs can be implemented (e.g. see infra). Various flags that describes types/variations of ADOs such as 'split', 'metapass', metaconcat', 'passthrough', etc. can be utilized.

As provide supra, data objects can be instantiated in memory. In one example, once the persistent control block structure is created as given above, the in-memory objects can be instantiated in an object-specific manner. The root of all the instantiations can be initiated from 'STO' instantiation. STOs can be instantiated via a mount inside the kernel. A mount can provide a way of grouping logical objects together within a super block. I-nodes can then, in turn, have object specific structures originating from them (e.g. s_fs_info and i_private pointers). Proxy storage data objects (e.g. proxy STOs) can include representations of the underlying data elements. Operations can be invoked on VSTOs by the above layers. STOs instantiations can trigger the instantiation of the VSTOs inside it. STO instantiation can include operations for reading the STO control block information and having a reference to the underlying ext3 and/or NFS filesystem. VSTO instantiations can also be performed via mounts as well. In this case, the VSTO control block information can be read and associated name spaces (and other meta-information related to VSTO depending on the type of VSTO) can be created. Each VSTO arrival can cause a notification to be sent to the client-device's user level control services which in turn can coordinate with the ADO layer to create data objects such as a replica manager object, an ADO object finally resulting in the mount of the ADO as well, and the like. When the ADO is mounted, applications can access their data via system calls. Data can be transparently distributed to different VSTOs depending on the type of the caching policy.

Figure 8:
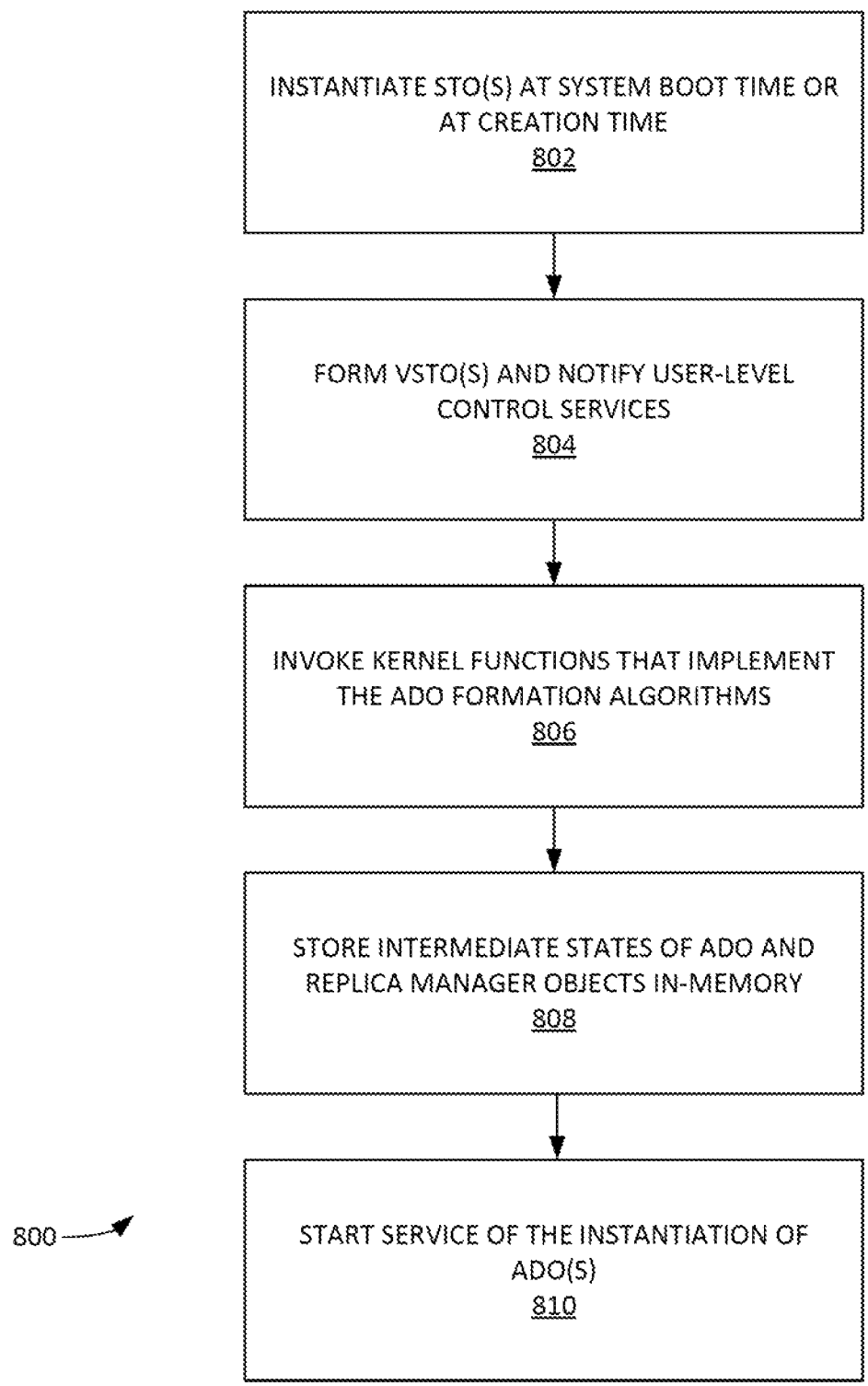
FIG. 8 illustrates an example process of instantiation of an ADO, according to some embodiments.

FIG. 8 illustrates an example process 800 of instantiation of an ADO, according to some embodiments. As said above, the root of the object instantiations starts from the STO instantiations. These trigger the VSTO instantiations, followed by ADO instantiations. However all these objects don't arrive at the same time, nor available at the same time to take informed decisions about the state of the dependent objects. In the design example above s1 could arrive before c1, and c1 could arrive before s1, and one of them could arrive much later than another. The ultimate objective is to fully form the ADOs so that applications could access them. One STO can be the basis for a fully formed ADO. However if the ADO is not fully formed appropriate states are stored in the object about the formation, that enable future VSTO arrival events or other to enable the completion of the ADO object formation. In light of this, in step 802 of process 800 STOs can be instantiated at system boot time or at creation time. In step 804, VTSO(s) can be formed and user-level control services can be notified accordingly. For example, a VSTO can be created after an STO creation. On completion of a VSTO instantiation, notifications can be communicated to the user-level control services. These notifications can include information about the VTSO. In step 806, kernel functions that implement ADO formation algorithms can be invoked. For example, the handler functionalities of the notifications invoke kernel functions that implement the ADO formation algorithms. In step 808, intermediate states of ADO and replica manager objects can be stored in memory. For example, intermediate states of the ADO objects and/or replica manager object can be stored in-memory to enable displaying of the states to the administrators. In step 810, the service of the instantiation of the ADO can be started. For example, once enough child objects arrive for the ADO object to fully start its service the instantiation of ADO object can be completed via mounting. Applications can then being utilizing the appropriate ADO object.

The above example can now be considered with respect to the sequence of data object arrivals (e.g. as provided in process 800). In this example, 's1(t1)' can denote the arrival of s1 at time t1. In this example, times denoted by $t_i$'s (e.g. absolute times) can be monotonically increasing for each '$i^{th}$' time. Accordingly, the following example schedule can be implemented.

1. s1(t1) can read the control block of s1. The mount of s1 can be triggered.

2. The mount of s1 can trigger instantiation of vs1. v1s1 can, in turn, read the v1s1 control block and v1s1 mounted leading to the arrival of v1s1(t1).

3. v1s1(t1) can trigger an arrival notification to user level control services.

4. v1s1(t1) arrival event can be sent to a kernel by the user level control services.

5. The kernel can then handle the arrival of v1s1(t1). The kernel can read the ADO control block on its side of v1s1, and form the vr1, and then ado1.

6. The state of ado1 can then indicate that it is missing another object, and assess itself to see if it can be considered as fully formed.

7. The ado1 can be in a 'writethrough' mode or 'writealways' mode. Data can be available in the v1s1, and therefore v1c1 may not be required for the ado1 to start. In that case, it can be indicated that the data object is fully formed. However, ado1 can work without the cache object v1c1.

8. If the ado1 is 'writeback', upon starting, ado1 may serve wrong data to the user as v1s1 may not be up-to-date with the v1c1. In this case, user action can be waited for and/or or arrival of vc1 can be waited for in order to then determine if the ado1 is fully formed.

The same steps 1 till 5 can be implemented for a subsequent arrival of c1 (t2) at time t2, (t2>t1), and then steps 5, 6 and 7 will slightly vary as the object's state will be evaluated again based on the new logic of arrival of c1(t2).

Other possible design states for this example include, inter alia:

a) c1 arrived before s1, and s1 never arrived.

b) s1 arrived before c1, and c1 arrived an arbitrary time later. During this time ado1 can be operational as a 'writethrough' ADO, and thus the cache data must be synchronized with the source (e.g. v1c1 may be synchronized with v1s1 accordingly) once the v1c1 arrives.

The states in the ADO control block (and/or the replica manager control block) and/or the VSTO control block determine the formation of the ADO data objects. Object formations can be implemented on the node where the object is served from (e.g. the local node). Alternatively, ADO data objects including the VSTOs and STOs can be served from external, as well as local nodes.

It is noted that object dynamics (e.g. formation algorithms, detachment, arrivals, state changes) can be asynchronous and distributed. Object dynamics can be transactional in nature (e.g. to recover from error scenarios, ensure the consistency of the persistent control blocks, and/or reliable determination of object states).

Data object departures and offline operations can also be implemented. Data object departures can be implemented via an explicit detachment of a cache object from a source ADO and/or via errors from the underlying VSTOs. Voluntary induction of object departures can be implemented by 'offline' operations from the user-level commands (e.g. via a command line interface) as well. Offline operations on an online ADO, can coordinate to quiesce the relevant data object currently being offlined. Quiescing a data object can include a two-step process: prevent new operations from entering the data object (e.g. each operation waits until the current quiesce completes the state change); and wait for all the currently ongoing operations to complete.

Once the two steps are completed, the data object state can be changed to 'offline. The unquiescence of the object, at which point all the operations that waited in step (a) above can return an EIO error to a caller functionality. The state change to offline can trigger an event notification to a user-level control service. Accordingly, a handler can invoke an appropriate kernel function that can assess the state change required in the relevant ADO data object and/or replica data object. In the event ADO data object is being offlined, the ADO can be unmounted and taken offline.

Returning to the example implementation, STO c1 can be taken offline any time for maintenance. This can cause a shutdown of the VSTOs v1c1. The data objects can unmount. Shutting down v1c1 can involve quiescing of the v1c1 to prevent any stale requests being active. Once it is quiesced the v1c1 object state can change to offline and trigger an event notification of the VSTO being offline. This VSTO-offline event can be handled by the ADO layer to operate without the cache device.

Enabling online additions/deletions of data objects to a set of inter-related objects that usually have the root as an ADO object can be implemented. The architecture of various embodiments can include operating an object interface for basic configuration operations, asynchronous I/O operations, long running I/O operations, etc. The number of active threads executed inside a data object can be counted. For threads that start asynchronous I/O operations whose completion occurs during I/O call backs, accounting increments can be implemented on entry and decrements can be implemented on exit of the I/O completion. For threads that provide the context for long running operations such as 'cacheify' thread, resynchronize thread, active cleaner, cleaner threads, etc. Quiesce operations can delay until these operations complete. Alternatively, these operations can be explicitly stopped on a case-by-case basis to enable faster quiesce operations.

The synchronization of the quiesce/offline/online/active operations entry and/or exit executions can be implemented with appropriate locks and/or error handling. These operations can be invoked transparently in the VSTO object interface. A set of observable parameters can be provided including: operation types, counts for each operation types, flags/states that assists in debugging and trouble shooting.

Active operations enter the gate and exit the gates. If the object is quiesced, then operations wait at the gate. If the object is offline, operations fail at the gate itself. In a continuation of the use-case example, a cleaner thread may be implemented to cleanup a set of data objects inside a cache (e.g. these data objects may be similar to files, not the objects described in this section.). Before starting the cleaning operation of the particular cache object v1c1, the cleaner thread enters the gate and once the cleaning operation is complete it exits the gate. Object gates can be implemented at the VSTO level, replica level, and/or the ADO level. Gates can be applied selectively for some operations, while others are allowed (e.g. read operations can be allowed, while write operations can be quiesced).

FIG. 9 illustrates a table 900 depicting various data object classes and corresponding allowed data types, according to some embodiments. The general object classes can include, inter alia, STOs, VSTOs, Replica VSTOs, and ADOs. Replica VSTO's can be implemented as a layered VSTO on top of other VSTOs. Replica VSTO's can route requests to an appropriate VSTO. The implementation of these data objects vary depending on the type of the objects and other parameters.

Figure 10:
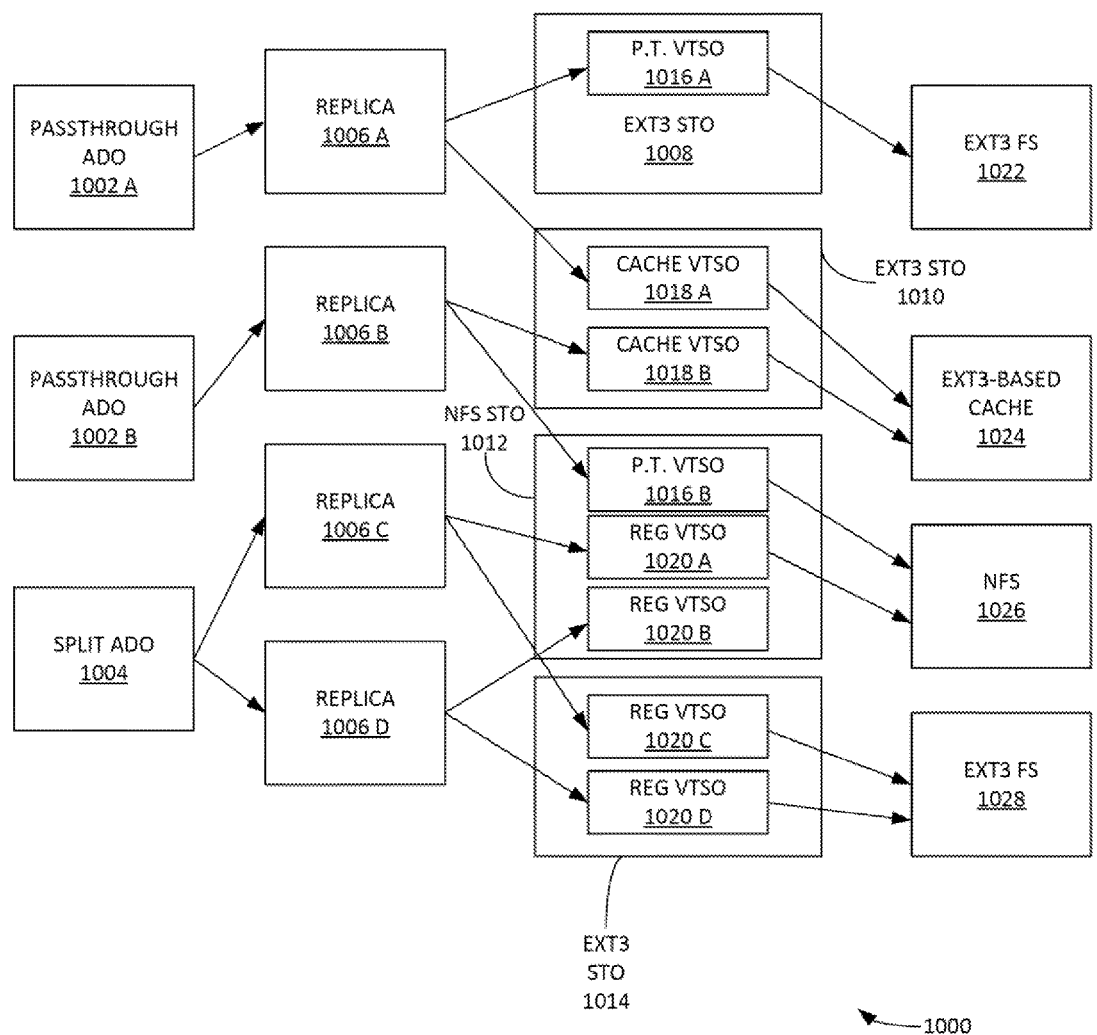
FIG. 10 illustrates an example middleware data management system, according to some embodiments.

FIG. 10 illustrates an example middleware data management system 1000, according to some embodiments. Middleware data management system 1000 includes ADOs 1002 A-B and 1004. ADO's 1002 A-B can include passthrough ADO's, one on ext3 (e.g. EXT3-BASED CACHE 1024) and one on NFS (NFS 1026), both using the same cache. ADO 1004 (e.g. a split ADO) can be a two-way replica split ADO. ADO 1004 can have files across NFS (e.g. NFS 1026) and EXT3-FS (e.g. EXT3 FS 1028). FIG. 10 illustrates various other mappings of ADOs 1002 A-B and 1004 to VSTOs (e.g. passthrough (PT) VSTO 1016 A-B, CACHE VSTO 1018 A-B, regular (REG) VSTO 1020 A-D) to STOs (e.g. EXT3 STO 1008, EXT3 STO 1010, EXT3 STO 1014, NFS STO 1012) and the backend filesystems (e.g. EXT3 FS 1022, EXT3-BASED CACHE 1024, NFS 1026, EXT3 FS 1028). Passthrough data objects can be data objects that reflect the underlying base filesystem or device's properties. VSTO passthrough functionalities can support directory operations pushed directly to the base file system (FS). ADO and VSTO passthrough functionalities can include intelligence of the overall structure of the data objects to ensure the correctness of the implementation. VSTO cache objects can maintain extra metadata related to mappings of the objects, and other, it is an enhancement of the VSTO regular object implementation. VSTO regular implementation can provide the basic interfaces for VSTO and the virtual data element name spaces. ADO 1004 can be implemented on top of a regular VSTO. The ADO 1004 can include intelligence of placement of data anywhere in the heterogeneous environment. One can imagine an ADO where it uses one passthrough VSTO, few regular STO, few cache VSTOs. A metaconcat ADO can be an ADO that concatenates multiple passthrough VSTOs to form a concatenated name space for a single ADO. A passthrough auto-cached ADO implemented on top of an autofs STO, creates a passthrough cached ADO for each mount point arrival in the underlying autofs STO. An autosf can be a package that provides support for automounting removable media and/or network shares when they are inserted and/or accessed.

Data objects can be implemented with various interface (e.g. integrate into existing filesystem interfaces as defined by operating systems, proprietary interfaces, etc.). A VSTO (e.g. replica VTSO) can implement an interface defined by the middleware system. The protocol of I/O requests spawned by data objects can follow a set of principles defined by the middleware system as well. A management interface defined by these data objects can enable control of creation, deletion, attachment of data objects, detachment of data objects, etc. according to the object type and the relationship between the objects. These functionalities can be implemented by user-level control services that can invoke input/output control functionalities on the kernel objects.

ADO objects can manage a set of file objects (e.g. an application file object (AFO), directories, special files, regular files with data being stored on the VSTOs in a persistent way, etc.). The distribution of the AFO to the VSTOs can depend on the type of the relevant ADO and/or policies set on the AFO and ADO. AFOs can be i-nodes in Linux environment.

A VSTO interface can be implemented by a replica data object and/or various types of VSTO. Use of an STO can be implemented with a handle to the VSTOs created in STO. VSTOs can manage a set of virtual data element objects (VEs). A collection of VE's can belong to a name space. A replica VSTO may not have its own VE name space.

The storage data object (STO) can be an umbrella object that serves multiple VSTOs. VSTO(s) in the STO can have different semantics in alignment with the underlying data element. Each of the VSTOs can have multiple VE namespaces. A VE can be the basic object of operation inside a VSTO. An STO can have a one to one mapping to an underlying data element. Occasionally, multiple storage objects per data element can be extant as well. In this case, each STO can be allocated a particular region of the data element. If the underlying data element is a filesystem and/or an NFS store, then individual directories can become an STO by itself. Thus there can be multiple independent, non-overlapping STOs corresponding to one data element. STOs can operate on a data element using standard interfaces. An STO can include information on the internals of the data element to exploit some specific optimization capabilities for performance.

An STO can be taken offline or online manually for administrative purposes or a dynamic error on I/O or any other operation on STO can result in the STO being taken offline. When an STO is taken offline, all the VSTOs inside that STO is also taken offline and that results in appropriate notifications to the higher layers so that they can handle these events gracefully. There are provisions to take an individual VSTO offline as well from an administrative point of view if required. The STOs persistent configuration information is stored inside the storage object header. The description of the STO header is given in the above section related to the object persistent control blocks. The STO can be available on top of data elements that are of type 'file systems' (e.g. ext3, XFS, NFS, (v3, v4)), on top of raw devices. VSTOs semantics/definitions of the mappings of the VSTO to the internals of data elements can be based on the STO implementation and the VSTO type. For example, in the case of STO on top of a raw device, there can be a VSTO that takes owner ship of that device's I/O related aspects. Whereas in case of a filesystem there can be multiple VSTOs each of which takes ownership of different directories in the filesystem and VSTOs should not have any overlap. The STO can provide the following properties when it comes to managing the VSTOs include, inter alia: definitive isolation between the VSTOs so that they can be independently carved out, deleted, without affecting the other VSTOs; provide a VSTO implementation dependent dependencies or interactions, if any, between the VSTOs; space management in terms of size, name space and other; and/or semantics of interaction with the underlying data element.

The storage object (STO) can share the data element with other storage objects or outside entities as well. Thus, either the STO can own the data element exclusively or in a shared manner with other stuff. Appropriate implementation logic to avoid data corruption and security issues should exist in those scenarios.

Virtual data elements can be the basic objects used to store and/or retrieve data in the VSTOs. Each of the virtual data objects can be mapped to an underlying data element in an implementation specific manner. VEs have a size, and many such VEs can be related in an implementation specific manner. For example, a cache VSTO can relate VEs belonging to a one cached file at the ADO level. VEs can be uniquely identified by VE identifiers and/or VE handles. VE handles can be unique inside of each VSTO. VEs can include several attributes related to its data, size, mapping. These attributes can be persisted or not persisted depending on the implementation. A VE namespace can be a collection of VEs that manages the allocation of VE identifiers, deletion, and management. VE namespace belong to a VSTO and can be shared between multiple VSTOs. VE identifier allocation can be based on the implementation as well. A VE identifier can directly map to the identifiers in the underlying data elements and/or can be allocated explicitly and then mapped to the underlying data element object identifiers. The namespace management can be based on the type of VSTO, or the type can be attributed to the namespace itself. For example, in a passthrough namespace management, VEID and/or VE handles can be one to one mapped to the underlying data element objects. The mappers can be used for mapping identifiers from one name space to another name space. Mappers can be persistent if required for fast lookups etc. VE identifiers can be mapped from VE namespace to the underlying data element objects. For example, VE identifiers can be mapped to the files inside data elements and/or any other objects inside data elements.

VTSO can be units of STO's. VTSO can be contained in a STOs. VSTOs can be replicated by layers above (e.g. replica VSTOs). VSTOs can own the VE namespaces. VSTOs can be responsible for managing the life cycle of the VE objects inside the namespace and the VE namespaces belonging to it. VEs can be instantiated on demand based on the operations performed on the VSTO and subsequent operations on the VEs require a VE handle to be passed. VSTO chooses the mapping methodology of the VE namespace to the underlying data element object name space. VSTO can select an appropriate type of mapper to manage the mappings. A VSTO can have a specified size (e.g. defined by blocks). A VSTO can manage the accounting of the blocks used in relation to the STOs and other VSTOs. VSTOs can be instantiated at the time STOs come online. A VSTO can be added into a STOs mounted list of VSTOs. VSTO can be plumbed into the higher layers (e.g. ADO objects) via VSTO object handles. The VSTO object handles can maintain a plumbing specific state and dynamic information. A VSTO can be plumbed into multiple objects at the higher layers depending on the implementation of VSTO. A distributed VSTO can be plumbed locally via a 'vstobj' handle and can be plumbed remotely via the remote 'vstobj' handle as well. Remote VSTOs implement the interface to interact with the VSTOs on a different node, to operate on the VEs and other objects inside the VSTO. A remote VSTO can use any transport, flexibly NFS, or infiniband-based MPI, or any other. Distributed VSTO objects can allow access of a VSTO from different nodes yet maintain consistency semantics specific to the type of VSTO. A consistency layer at the level of VSTO can enable the higher layers to implement scalable distributed data routing layers.

As described in the table of FIG. 9, different types of VSTOs depending on the name space management, mapping, and other. VSTO types can be regular, passthrough, metapass, and cache types. Regular VSTOs can have one VE namespace, and the VE identifiers can be mapped dynamically to the underlying dataelement's objects. VE object attributes can store the underlying object identifiers persistently. Regular VSTO can provide the semantics of flat VE objects which contains data. Regular VSTO provides operations for allocation/deallocation of VE identifiers by the top layers, read/write operations on the VE identifiers. Regular VSTOs may not support directory related operations. Regular VSTOs function on top of data elements but map the VE identifiers to the flat objects underneath. In case of passthrough VSTO there is no persistent VE namespace. Instead the VE objects can be in-memory and mapped one to one with the underlying data element objects. VE identifiers can be exactly same as that of the underlying dataelement objects' identifiers. Passthrough VSTOs support directory operations that can be passthrough operations. Passthrough VSTO passes the operations to the underlying objects (e.g. when VE identifiers are one-to-one) without any remapping operations. Metapass VSTO is similar to passthrough VSTO, except that there is an explicit mapping of VE identifiers to the underlying data element objects. VEID mappings can be maintained such that the data element object identifiers can be persistent. The use of metapass VSTO comes in where the higher level replication layers want to see a uniform name space for VE identifiers across multiple VSTOs even though the underlying data element object identifiers could change. Cache VSTO implements the caching semantics. Cache VSTO has multiple name spaces—chunk name space, and meta-name spaces. Cache VSTO supports eviction of VEs when running out of space, and has sophisticated algorithms to manage the cache space and accounting. Cache VSTO supports various semantics of 'writeback', 'writethrough', and/or 'writealways' types and cache objects from a corresponding source VSTO. In a typical case source VSTO is a passthrough VSTO and the replica VSTO does the routing of the data between the source and the cache VSTOs. Cache VSTOs uses cache mappers to maintain the mapping of the source objects to cache objects. These mappings can be persistent.

Replica VSTO can be a kind of VSTO used to manage routing/replication policies between multiple and any VSTOs below it. The relationships can be captured in the diagram shown in FIG. 10 (with elements to the left being 'above' elements to the right of the figure). Replica manager manages the replica VSTOs. The middleware system can support n-way replica in a generic way. A replica can be a copy of the VSTO. In some embodiments, replicas can be VSTOs. A replica data object can be partial or full replica data object. A partial replica data object may not contain the data necessary for access by higher level objects. A full replica data object can contain the data necessary for access by the higher level objects. Replica VSTOs can implement error recovery algorithms, synchronization algorithms between the inconsistent VSTOs, all of which can be accomplished while the VSTOs are online.

Application data objects (ADOs) map files and/or directories to the underlying VSTOs. ADO's can integrate into the general filesystem interface of an operating system. ADOs can provide a meta-filesystem architecture 'on top' of VSTOs which are, in turn. 'on top' of existing data elements. Data elements can be filesystems (NFS, ext3, and iSCSI, SAN, etc.). The ADO layer can acts as a "Data Router" to route the data to different VSTOs. The ADO layer can provide the infrastructure of dynamically managing data placement and scaling based on applications' SLA/SLO requirements. The ADO layer can utilize mappers (e.g. regular mappers, passthrough mappers and/or 'fbmappers') to map ADO level objects to lower level objects. Different types of ADOs can include, inter alia: passthrough ADO (E.g. an ADO in conjunction with the replica layer routes the data to data elements and the cache devices for increased performance; a metapass ADO (e.g. an ADO in conjunction with replica layer routes the data for replication, or caching); Split/Scalable ADO (e.g. an ADO that scales across multiple data elements by splitting files, replicating across the VSTOs that are on top of the data elements); a distributed ADOs (e.g. a distributed ADOs that can provide the abstraction of a single ADO across multiple nodes and it can be of type passthrough, split/scalable); and/or concatenation ADOs (e.g. an ADO that allow concatenation of a set of VSTOs in passthrough mode).

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it may be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A method implementing an application-oriented dynamic data management middleware layer comprising:
  instantiating, with at least one processor, a storage object, wherein the storage object comprises a unique identifier, a data element and one or more virtual storage object;
  forming the virtual storage object in the storage object, wherein the virtual storage object comprises a set of virtual data elements and name spaces;
  invoking a set of kernel functions of a client-side computing system utilizing the application-oriented-middleware layer, wherein the set of kernel functions implement formation of an application data object, wherein the application data object maps files and directories and other application data to the virtual storage object and integrates into a filesystem interface of an operating system on the client-side computing system or on a server side computing system;

forming the application data object based on policies and a service level agreement requirement of the user applications; and initiating a data routing service of the application data object.

2. The method of claim 1, wherein the storage object, virtual storage objects and application data objects are instantiated during a booting operation of the client-side computing system.

3. The method of claim 1 further comprising:
notifying a control service of the operating system on the computing device.

4. The method of claim 1 further comprising:
storing a state of the application data object in memory of the computing device.

5. The method of claim 1 wherein the service of the application data object comprises a meta-filesystem architecture built on top of the virtual storage object.

6. The method of claim 1, wherein the application data object comprises intelligent placement of data in a heterogeneous data storage environment abstracted as storage objects.

7. The method of claim 1, wherein the storage object manages the virtual storage object, wherein the virtual storage object can be deleted without affecting another virtual storage object in the storage object, and wherein the data element comprises a unit of data that can be present in the virtual storage object.

8. The method of claim 7, wherein the virtual data element comprises a basic data object used to store and retrieve data in the virtual storage object, and wherein the virtual data element is mapped to an underlying data element of the storage object in which the virtual storage object resides.

9. The method of claim 1, wherein the data routing service of the application data object comprises routing data from an application of the computing system to the virtual storage object.

10. The method of claim 1, wherein dynamic mappings of the application data to the virtual storage objects are created.

11. The method of claim 1, wherein a unified name space for the application data objects are presented the set of coherency protocols between a VST object based on an application requirement both over local area network (LAN) and wide area network (WAN).

12. A computer system comprising:
a physical processor configured to execute instructions;
a memory containing instructions when executed on the processor, causes the processor to perform operations that:

instantiates, with at least one processor, a storage object, wherein the storage object comprises a unique identifier, a data element and a virtual storage object;

forms the virtual storage object in the storage object, wherein the virtual storage object comprises a virtual data element;

invokes a set of kernel functions of a client-side computing system utilizing the application-oriented middleware layer, wherein the set of kernel functions implement formation of an application data object, wherein the application data object is configured to map files and directories and other application data to the virtual storage object and configured to integrate into a filesystem interface of an operating system of the client-side computing system;

forms the application data object; and initiates a data routing service of the application data object.

13. The computer system of claim 12, wherein the storage object is instantiated during a booting operation of the client-side computing system.

14. The computer system of claim 12, wherein the memory containing instructions when executed on the processor, causes the processor to perform operations that:
notify a control service of the operating system of e client side computing device.

15. The computer system of claim 12, wherein the memory containing instructions when executed on the processor, causes the processor to perform operations that:
stores a state of the application data object in memory of the client-side computing device.

16. The computer system of claim 12, wherein the storage object manages the virtual storage object, wherein the virtual storage object can be deleted without affected another virtual storage object in the storage object, and wherein the data element comprises a file system.

17. The computer system of claim 16, wherein the virtual data element comprises a basic data object used to store and retrieve data in the virtual storage object, and wherein the virtual data element is mapped to an underlying data element of the storage object in which the virtual storage object resides.

18. The computer system of claim 17, wherein data is transparently distributed to the virtual storage object according to a placement policy related to performance, reliability and scalability.

* * * * *